United States Patent
Flickinger

(10) Patent No.: US 10,034,062 B1
(45) Date of Patent: Jul. 24, 2018

(54) SCHEDULING AND PRESENTING IPG ADS IN CONJUNCTION WITH PROGRAMMING ADS IN A TELEVISION ENVIRONMENT

(71) Applicant: Prime Research Alliance E., Inc.

(72) Inventor: Gregory Flickinger, Furlong, PA (US)

(73) Assignee: PRIME RESEARCH ALLIANCE E, INC. (VG)

( * ) Notice: Subject to any disclaimer, the term of this patent is extended or adjusted under 35 U.S.C. 154(b) by 238 days.

(21) Appl. No.: 14/204,062

(22) Filed: Mar. 11, 2014

Related U.S. Application Data

(63) Continuation of application No. 13/253,387, filed on Oct. 5, 2011, now Pat. No. 8,671,426, which is a continuation of application No. 12/643,596, filed on Dec. 21, 2009, now Pat. No. 8,042,131, which is a continuation of application No. 09/749,255, filed on Dec. 27, 2000, now Pat. No. 7,653,923.

(60) Provisional application No. 60/238,056, filed on Oct. 5, 2000.

(51) Int. Cl.
*H04N 7/10* (2006.01)
*H04N 7/025* (2006.01)
*H04N 21/81* (2011.01)
*H04N 21/482* (2011.01)

(52) U.S. Cl.
CPC ....... *H04N 21/812* (2013.01); *H04N 21/4821* (2013.01)

(58) Field of Classification Search
CPC .. H04N 21/812; H04N 7/165; H04N 7/17318; H04N 21/435; H04N 21/235
USPC .............................. 725/32–36, 39, 41–47, 51
See application file for complete search history.

(56) References Cited

U.S. PATENT DOCUMENTS

| | | |
|---|---|---|
| 4,602,279 A | 7/1986 | Freeman |
| 4,930,011 A | 5/1990 | Kiewit |
| 5,029,014 A | 7/1991 | Lindstrom |
| 5,099,319 A | 3/1992 | Esch et al. |
| 5,155,591 A | 10/1992 | Wachob |
| 5,231,494 A | 7/1993 | Wachob |
| 5,233,423 A | 8/1993 | Jernigan et al. |
| 5,271,626 A | 12/1993 | Llenas et al. |

(Continued)

FOREIGN PATENT DOCUMENTS

| | | |
|---|---|---|
| CA | 2264392 | 1/1999 |
| WO | 9827723 | 6/1996 |

(Continued)

OTHER PUBLICATIONS

U.S. Appl. No. 09/635,539, filed Aug. 10, 2000. First named inventor: Charles A. Eldering.

(Continued)

*Primary Examiner* — Jason Salce
(74) *Attorney, Agent, or Firm* — The Belles Group, P.C.

(57) ABSTRACT

A method and system whereby conventional television advertisements (i.e., those delivered to viewers while they watch television programming) can be delivered in conjunction with and correlated with advertisements that are presented to viewers in the Interactive Program Guide (IPG). Moreover, the invention described herein provides for delivering highly targeted ads to viewers in both conventional programming avails and in the IPG, and for linking the targeted ads in these two media to provide for enhanced and highly effective advertising campaigns.

20 Claims, 5 Drawing Sheets

(56) References Cited

U.S. PATENT DOCUMENTS

| | | |
|---|---|---|
| 5,283,639 A | 2/1994 | Esch et al. |
| 5,319,455 A | 6/1994 | Hoarty et al. |
| 5,410,344 A | 4/1995 | Graves et al. |
| 5,424,770 A | 6/1995 | Schmelzer et al. |
| 5,425,100 A | 6/1995 | Thomas et al. |
| 5,449,619 A | 9/1995 | Griffin et al. |
| 5,485,197 A | 1/1996 | Hoarty |
| 5,515,098 A | 5/1996 | Caries |
| 5,534,911 A | 7/1996 | Levitan |
| 5,559,549 A | 9/1996 | Hendricks et al. |
| 5,579,055 A | 11/1996 | Hamilton et al. |
| 5,585,858 A | 12/1996 | Harper et al. |
| 5,600,364 A * | 2/1997 | Hendricks ............. H04H 20/10 |
| | | 348/E5.002 |
| 5,600,366 A | 2/1997 | Schulman |
| 5,600,573 A | 2/1997 | Hendricks et al. |
| 5,612,742 A | 3/1997 | Krae et al. |
| 5,621,728 A | 4/1997 | Lightfoot et al. |
| 5,635,978 A | 6/1997 | Allen et al. |
| 5,636,346 A | 6/1997 | Saxe |
| 5,650,994 A | 7/1997 | Daley |
| 5,652,615 A | 7/1997 | Bryant et al. |
| 5,657,072 A | 8/1997 | Aristides et al. |
| 5,661,516 A | 8/1997 | Caries |
| 5,666,645 A | 9/1997 | Thomas et al. |
| 5,699,107 A | 12/1997 | Lawler et al. |
| 5,724,091 A | 3/1998 | Freeman et al. |
| 5,724,521 A | 3/1998 | Dedrick |
| 5,740,549 A | 4/1998 | Reilly et al. |
| 5,752,160 A | 5/1998 | Dunn |
| 5,752,238 A | 5/1998 | Dedrick |
| 5,758,259 A | 5/1998 | Lawler |
| 5,758,328 A | 5/1998 | Giovannoli |
| 5,760,821 A | 6/1998 | Ellis et al. |
| 5,761,601 A | 6/1998 | Nemirofsky et al. |
| 5,761,662 A | 6/1998 | Dasan |
| 5,774,170 A | 6/1998 | Hite et al. |
| 5,781,226 A | 7/1998 | Sheehan |
| 5,790,426 A | 8/1998 | Robinson |
| 5,790,935 A | 8/1998 | Payton |
| 5,801,747 A | 9/1998 | Bedard |
| 5,801,753 A | 9/1998 | Eyer et al. |
| 5,805,974 A | 9/1998 | Hite et al. |
| 5,808,694 A | 9/1998 | Usui et al. |
| 5,815,671 A | 9/1998 | Morrison |
| 5,861,919 A | 1/1999 | Perkins et al. |
| 5,886,731 A | 3/1999 | Ebisawa |
| 5,892,535 A | 4/1999 | Allen et al. |
| 5,917,830 A | 6/1999 | Chen et al. |
| 5,918,014 A | 6/1999 | Robinson |
| 5,926,205 A | 7/1999 | Krae et al. |
| 5,931,901 A | 8/1999 | Wolfe et al. |
| 5,940,073 A | 8/1999 | Klosterman et al. |
| 5,948,061 A | 9/1999 | Merriman et al. |
| 5,966,120 A | 10/1999 | Arazi et al. |
| 5,969,715 A | 10/1999 | Dougherty et al. |
| 5,978,381 A | 11/1999 | Perlman et al. |
| 5,990,927 A | 11/1999 | Hendricks et al. |
| 6,002,393 A | 12/1999 | Hite et al. |
| 6,002,394 A | 12/1999 | Schein et al. |
| 6,009,409 A | 12/1999 | Adler et al. |
| 6,009,410 A | 12/1999 | LeMole et al. |
| 6,020,880 A | 2/2000 | Naimpally |
| 6,020,883 A | 2/2000 | Herz et al. |
| 6,026,368 A | 2/2000 | Brown et al. |
| 6,026,369 A | 2/2000 | Capek |
| 6,029,045 A | 2/2000 | Picco et al. |
| 6,038,256 A | 3/2000 | Linzer et al. |
| 6,055,510 A | 4/2000 | Henrick et al. |
| 6,061,097 A | 5/2000 | Satterfield |
| 6,075,551 A | 6/2000 | Berezowski et al. |
| 6,088,722 A | 7/2000 | Herz et al. |
| 6,119,098 A | 9/2000 | Guyot et al. |
| 6,141,010 A | 10/2000 | Hoyle |
| 6,144,653 A | 11/2000 | Persson et al. |
| 6,160,570 A | 12/2000 | Sitnik |
| 6,177,931 B1 * | 1/2001 | Alexander ......... G06Q 30/0269 |
| | | 348/565 |
| 6,253,238 B1 | 6/2001 | Lauder et al. |
| 6,263,501 B1 | 7/2001 | Schein et al. |
| 6,282,713 B1 | 8/2001 | Kitsukawa et al. |
| 6,378,130 B1 | 4/2002 | Adams |
| 6,418,122 B1 | 7/2002 | Schoenblum et al. |
| 6,425,131 B2 | 7/2002 | Crandall et al. |
| 6,425,134 B1 | 7/2002 | Huang |
| 6,434,747 B1 | 8/2002 | Khoo et al. |
| 6,446,082 B1 | 9/2002 | Arita |
| 6,446,261 B1 | 9/2002 | Rosser |
| 6,459,427 B1 | 10/2002 | Mao et al. |
| 6,463,585 B1 | 10/2002 | Hendricks et al. |
| 6,487,721 B1 | 11/2002 | Safadi |
| 6,493,875 B1 | 12/2002 | Eames et al. |
| 6,505,169 B1 | 1/2003 | Bhagavath et al. |
| 6,516,002 B1 | 2/2003 | Huang et al. |
| 6,583,825 B1 | 6/2003 | Yuen et al. |
| 6,615,039 B1 | 9/2003 | Eldering |
| 6,631,523 B1 | 10/2003 | Matthews, III et al. |
| 6,675,385 B1 | 1/2004 | Wang |
| 6,684,194 B1 | 1/2004 | Eldering et al. |
| 6,698,020 B1 | 2/2004 | Zigmond et al. |
| 6,704,930 B1 | 3/2004 | Eldering et al. |
| 6,714,917 B1 | 3/2004 | Eldering et al. |
| 6,718,551 B1 | 4/2004 | Swix et al. |
| 6,724,974 B2 | 4/2004 | Naruto et al. |
| 6,738,978 B1 | 5/2004 | Hendricks et al. |
| 6,745,391 B1 | 6/2004 | Macrae et al. |
| 6,796,555 B1 | 9/2004 | Blahut |
| 6,799,326 B2 | 9/2004 | Boylan, III et al. |
| 6,820,277 B1 | 11/2004 | Eldering et al. |
| 7,105,030 B2 | 9/2006 | Despres, III et al. |
| 7,653,923 B2 * | 1/2010 | Flickinger ............. G06Q 30/02 |
| | | 725/32 |
| 8,042,131 B2 * | 10/2011 | Flickinger ............. G06Q 30/02 |
| | | 725/32 |
| 8,151,295 B1 | 4/2012 | Eldering et al. |
| 8,671,426 B2 * | 3/2014 | Flickinger ............. G06Q 30/02 |
| | | 725/32 |
| 2001/0013124 A1 | 8/2001 | Klosterman et al. |
| 2001/0032333 A1 | 10/2001 | Flickinger |
| 2002/0026645 A1 | 2/2002 | Son et al. |
| 2002/0038455 A1 | 3/2002 | Srinivasan et al. |
| 2002/0083439 A1 | 6/2002 | Eldering |
| 2002/0083442 A1 | 6/2002 | Eldering |
| 2002/0083443 A1 | 6/2002 | Eldering |
| 2002/0087975 A1 | 7/2002 | Schlack |
| 2002/0087976 A1 | 7/2002 | Kaplan et al. |
| 2002/0104083 A1 | 8/2002 | Hendricks et al. |
| 2002/0129374 A1 | 9/2002 | Freeman et al. |
| 2002/0144263 A1 * | 10/2002 | Eldering ............... G06Q 30/02 |
| | | 725/34 |
| 2002/0152471 A1 | 10/2002 | De Haas |
| 2003/0020744 A1 | 1/2003 | Ellis et al. |
| 2003/0145323 A1 | 7/2003 | Hendricks et al. |
| 2003/0200128 A1 | 10/2003 | Doherty |
| 2003/0208756 A1 | 11/2003 | Macrae et al. |

FOREIGN PATENT DOCUMENTS

| | | |
|---|---|---|
| WO | 9828906 | 7/1996 |
| WO | 9712486 | 4/1997 |
| WO | 9717774 | 5/1997 |
| WO | 9901984 | 1/1999 |
| WO | 9904561 | 1/1999 |
| WO | 99074561 | 1/1999 |
| WO | 9911065 | 3/1999 |
| WO | 9926415 | 5/1999 |
| WO | 9929109 | 6/1999 |
| WO | 9952285 | 10/1999 |
| WO | 9955066 | 10/1999 |
| WO | 9960789 | 11/1999 |
| WO | 9965237 | 12/1999 |
| WO | 9966719 | 12/1999 |
| WO | 0021287 | 4/2000 |

(56) References Cited

FOREIGN PATENT DOCUMENTS

| WO | 0033224  | 6/2000  |
|----|----------|---------|
| WO | 0054504  | 9/2000  |
| WO | 0069163  | 11/2000 |
| WO | 0147279  | 6/2001  |
| WO | 00494801 | 10/2001 |
| WO | 0064166  | 4/2002  |
| WO | 0233973  | 4/2002  |
| WO | 0233975  | 4/2002  |

OTHER PUBLICATIONS

U.S. Appl. No. 09/635,542, filed Aug. 10, 2000. First named inventor: Charles A. Eldering.
U.S. Appl. No. 09/857,160, filed Jul. 1, 2001, First named inventor: Charles A. Eldering.
J. Scott Bachman and Stephen Dukes. "Compressed Digital Commercial Insertion: New Technology Architectures for the Cable Advertising Business." 1992 NCTA Technical Papers. pp. 447-454.
Adlink Engineering Diagrams. Adlink, 19993 17 pages.
Claria Website. Last accessed on Apr. 5, 2004 at http://www.claria.com 5 pages.

\* cited by examiner

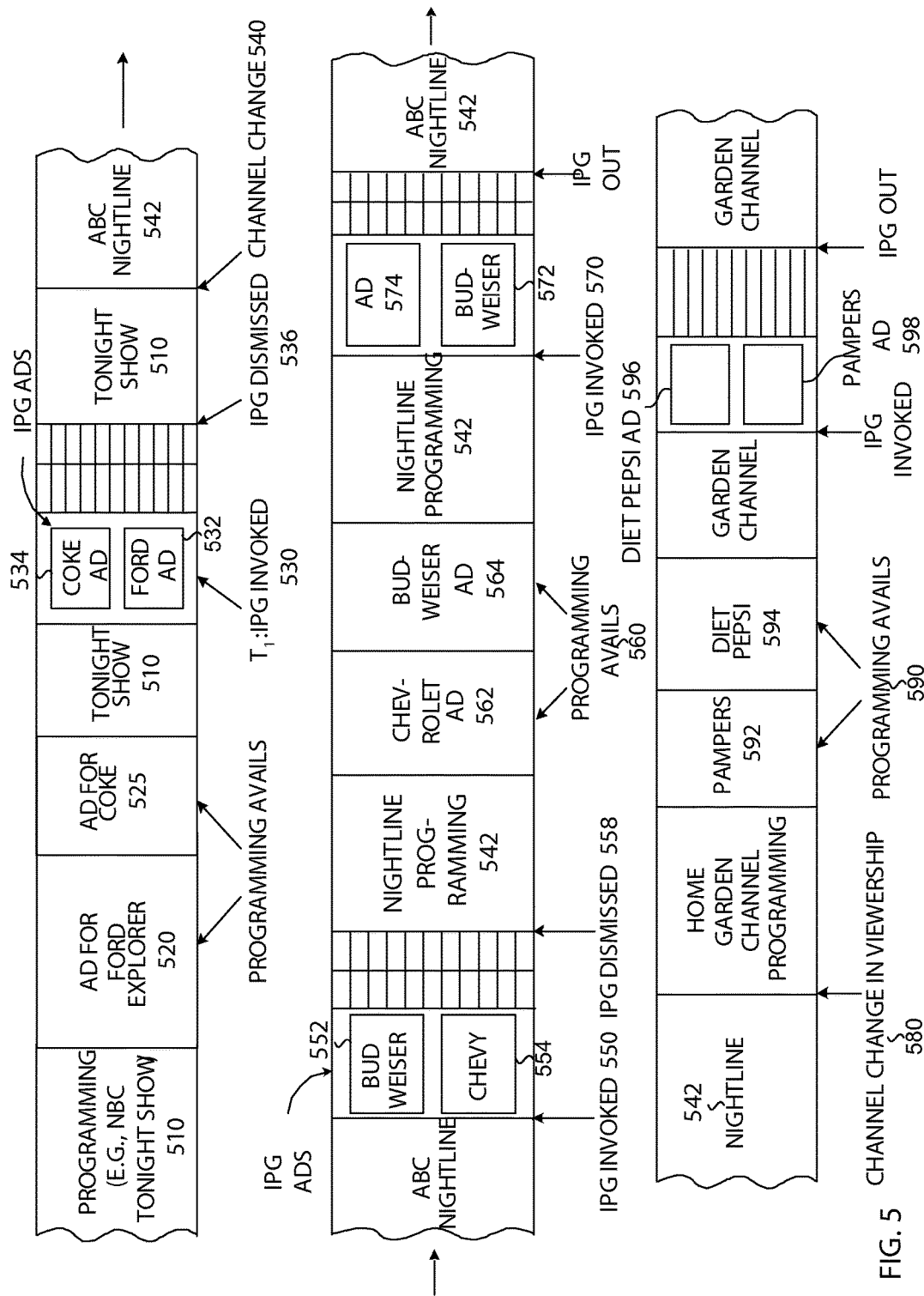
FIG. 5 CHANNEL CHANGE IN VIEWERSHIP

SCHEDULING AND PRESENTING IPG ADS IN CONJUNCTION WITH PROGRAMMING ADS IN A TELEVISION ENVIRONMENT

CROSS REFERENCE TO RELATED APPLICATIONS

This application is a continuation of U.S. patent application Ser. No. 13/253,387, filed Oct. 5, 2011, and entitled Scheduling and Presenting IPG Ads in Conjunction with Programming Ads in a Television Environment, which is a continuation of U.S. patent application Ser. No. 12/643,596 (now U.S. Pat. No. 8,042,131), filed Dec. 21, 2009, and entitled Scheduling and Presenting IPG Ads in Conjunction with Programming Ads in a Television Environment, which is a continuation of U.S. patent application Ser. No. 09/749,255 (now U.S. Pat. No. 7,653,923), filed Dec. 27, 2000, and entitled Scheduling and Presenting IPG Ads in Conjunction with Programming Ads in a Television Environment, the entire disclosures of which are incorporated herein by reference. U.S. patent application Ser. No. 09/749,255 claims the benefit of U.S. Provisional Application No. 60/238,056 filed on Oct. 5, 2000.

This application is related to the following U.S. application Ser. No. 09/635,252 filed on Aug. 9, 2000 (now abandoned), entitled Subscriber Characterization Based Electronic Program Guide Data; Ser. No. 09/635,253 (now U.S. Pat. No. 6,714,917), filed on Aug. 9, 2000, entitled Subscriber Identification Based on Electronic Program Guide Data; Ser. No. 09/635,542 (now abandoned), filed on Aug. 10, 2000, entitled Grouping Subscribers Based Demographic Data; Ser. No. 09/742,506 (now abandoned), filed on Dec. 21, 2000, entitled Internet-Based Electronic Program Guide Advertisement Insertion Method and Apparatus; and Ser. No. 09/658,204 (now abandoned), filed on Sep. 8, 2000, entitled Targeted Advertising Through Electronic Program Guide.

This application is also related to the following U.S. Provisional Application No. 60/183,411 filed on Feb. 18, 2000, entitled Ad Management System; 60/196,375 filed on Apr. 12, 2000, entitled Ad Marching Service; 60/229,156 filed on Aug. 31, 2000, entitled Method and System for Addressable and Program Independent Advertising.

BACKGROUND OF THE INVENTION

Television (TV) advertising is a major component in assisting manufacturers, distributors, vendors, and other organizations interested in publicizing their product, brand, service, or viewpoint, in reaching segments of the public. Moreover, TV advertising during TV programs (programming ads) subsidizes the cost of a large part of TV programming delivered to consumers. Advertisers commonly wish to deliver (target) certain programming ads to one or more groups of subscribers, such groups having particular demographic characteristics, such as income, age, gender, etc. These advertisers typically have access to market and demographic studies that allow them limited control over delivering their ads to specific groups of subscribers. One such method is "linked sponsorship", well known and used in the advertising industry. Linked sponsorship involves determining what demographic group or groups watch particular programming (e.g., from Nielsen data), and then buying (or contracting for) commercial spots during those programs for which the demographic viewership matches the desires of the advertiser. Improvements over the linked sponsorship model have been developed which allow advertisers to target their ads to the appropriate viewers or groups of viewers more efficiently. Such systems are disclosed in applicants co-pending U.S. application Ser. No. 09/591,577 filed on Jun. 9, 2000 entitled "Privacy-Protected Advertising System", Ser. No. 09/268,579 filed on Mar. 12, 1999 entitled "Consumer Profiling System", Ser. No. 09/268,526 filed on Mar. 12, 1999 entitled "Advertising Selection System Supporting Discretionary Target Market Characteristics", and Ser. No. 09/553,637 filed on Apr. 20, 2000 entitled "Advertising Management System for Digital Video Streams". All of these applications are hereby incorporated by reference herein. These systems provide, inter alia, for the collection and processing of consumer and subscriber data in order to develop a profile for a subscriber or group of subscribers. These profiles, along with ad characterizations and other advertiser requirements, are used to match and deliver "targeted" ads to subscribers such that subscribers receive ads more appropriate for them (i.e., of more interest and hence more effective). Delivery of the targeted ads to appropriate subscribers/viewers can be accomplished in a variety of ways, as described in the aforementioned applications, including both upstream ad insertion (e.g., at a cable head-end or telco central office) and local ad insertion (e.g., ad storage and insertion at a subscriber's set-top box (STB)). These targeted advertising systems provide advertisers with the means to target and reach subscribers of interest to them more effectively. In the advertising systems mentioned above, delivery to the subscriber of targeted or program independent advertising is accomplished while the subscriber is viewing a particular program. Targeted ads can be delivered with particular programming or they can be inserted at the STB and presented to the subscriber independent of the programming being viewed. When used herein, the terms "programming ads" and "telecast ads" refer to conventional television advertisements (i.e., video ads played during conventional programming such as a 30 second spot for a FORD Explorer™ played during a commercial "break" in prime time programming).

Another means and medium for delivering advertisements to TV viewers is via Electronic Program Guides (EPG) or Interactive Program Guides (IPG). EPGs and IPGs are well known in the art as interactive tools that provide television programming information to viewers. Typically, an IPG (or EPG) display includes a menu of programs and allows the viewer to select desired broadcast channels. Normally, the selection is accomplished by the viewer's highlighting of the desired option with a remote control device. The IPG (or EPG) is typically implemented in software which runs on a STB connected between a TV and a cable system home entry line. When scrolling to a new column or row, the IPG inserts the appropriate programming information into each new row or column. This information is either cached at the STB, or requested from the cable system's head-end. Examples of such EPG interfaces are disclosed in U.S. Pat. No. 5,479,268 by Young, et al. and U.S. Pat. No. 5,880,768 by Lemmons, et al.

IPGs may also contain advertising, and typically do so by using space in one portion of the screen to display a static advertisement. These advertisements are generally pre-programmed and the same advertisements are displayed to all the subscribers (viewers). Displaying advertisements in the IPG is disclosed in International Publication WO9827723A1 by Yuen, et al. Often, the vast majority of the viewers of the advertisement deems the advertisement irrelevant and ignore it. Methods and systems for delivering more suitable and targeted ads in the IPG, based on subscriber/viewer profiles and/or demographics and the like have been described in detail in Applicant's co-pending U.S. application Ser. No. 09/658,204 filed on Sep. 8, 2000 and U.S. Provisional application No. 60/238,056 filed on Oct. 5, 2000, and have also recently been mentioned by Yuen, et al. in International Publication WO049801A1.

Although these systems do provide for delivering targeted ads to viewers via the IPG, the IPG ads remain independent of conventional programming ads and are not linked to the programming ads in any way. This lack of linking or correlation between IPG ads and programming ads ignore the vast potential of increasing advertisement effectiveness by linking these two forms of ads, and thereby providing customized and enhanced ad opportunities for the advertiser to reach the subscriber without "saturating" the viewer with the same programming ad and causing the viewer to "tune out" the repeated ad.

For the foregoing reasons, there is a need for a method and system by which advertisements presented or displayed in the IPG are linked or correlated with conventional programming ads such that ad effectiveness and advertiser reach are enhanced and whereby advertisers have a greater variety of ways to customize their ad and ad campaigns presented to the subscriber/viewer in both programming and IPG contexts, and which provides for a means for viewer interaction and feedback regarding the ads. Moreover, there is a specific need for linking and correlating targeted advertising in the IPG with targeted advertising during programming.

For example, an ad in the IPG, when seen by the viewer, followed by a similar or related ad played during programming watched by the viewer may enhance the attentiveness of the viewer during the programming ad as well as increase the viewer's pretension (i.e., memory) of the ad without causing the viewer to tune-out the ad. An ad in the IPG which is correlated with and which follows a programming ad may afford the viewer a means to interact with or request more information about the advertised product or service.

SUMMARY OF THE INVENTION

The present invention comprises a method and system whereby conventional television advertisements (i.e., those delivered to viewers while they watch television programming) can be delivered in conjunction with and correlated with advertisements that are presented to viewers in an Interactive Program Guide (IPG) or Electronic Program Guide (EPG). Moreover, the invention described herein provides for delivering highly targeted ads to viewers in both conventional programming avails and in the IPG, and for linking the targeted ads in these two medias to provide for enhanced and highly effective advertising campaigns. According to one aspect of the invention, both programming ads and IPG ads, targeted to specific subscribers or groups of subscribers, are temporally linked and scheduled to be presented to the appropriate target group in a variety of sequences that may enhance the effectiveness of an advertising campaign by providing the subscriber with greater exposure to an advertised product while avoiding saturation by foregoing annoying repetitions of programming ads, and by providing mechanisms for the viewer to access or request more information, via the IPG, about a product or service advertised. Such linking and scheduling of correlated programming ads and IPG ads can be accomplished in conventional systems that provide for programming ad substitution upstream from the subscriber (e.g., at the head-end) as well as in systems that insert ads locally (e.g., at the subscriber's set-top box (STB).

In one embodiment, there is an IPG advertisement management system (AMS) which is separate from but interfaces with a programming AMS. In another embodiment, the IPG AMS and programming AMS are integrated as one system.

In one embodiment one or more specific and targeted IPG ads are displayed in the IPG prior to the displaying of one or more specific targeted and related programming ad.

In another embodiment one or more specific and targeted IPG ads are displayed in the IPG subsequent to the displaying of one or more specific targeted and related programming ad.

In yet another embodiment one or more specific and targeted IPG ads are displayed in the IPG prior to and subsequent to the displaying of one or more specific targeted and related programming ad.

In one embodiment an IPG ad can be clicked on and this behavior by the viewer can be used to profile the viewer or to prioritize subsequent displaying of programming or IPG ads.

In another embodiment, an ad displayed in the IPG is an interactive ad, and can be accessed (e.g., clicked on) by the viewer for various purposes including, but not limited to, bookmarking the ad for later review, accessing a particular website via the Internet, requesting more information, requesting playing of a linked or correlated programming ad, for recording and measuring viewer interest in the advertised product or service, etc.

These and other features and objects of the present invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 5 depicts a hypothetical sequence of programming and IPG ads, as seen by one or more viewers, according to one embodiment of the invention. The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DETAILED DESCRIPTION

Figure 1:
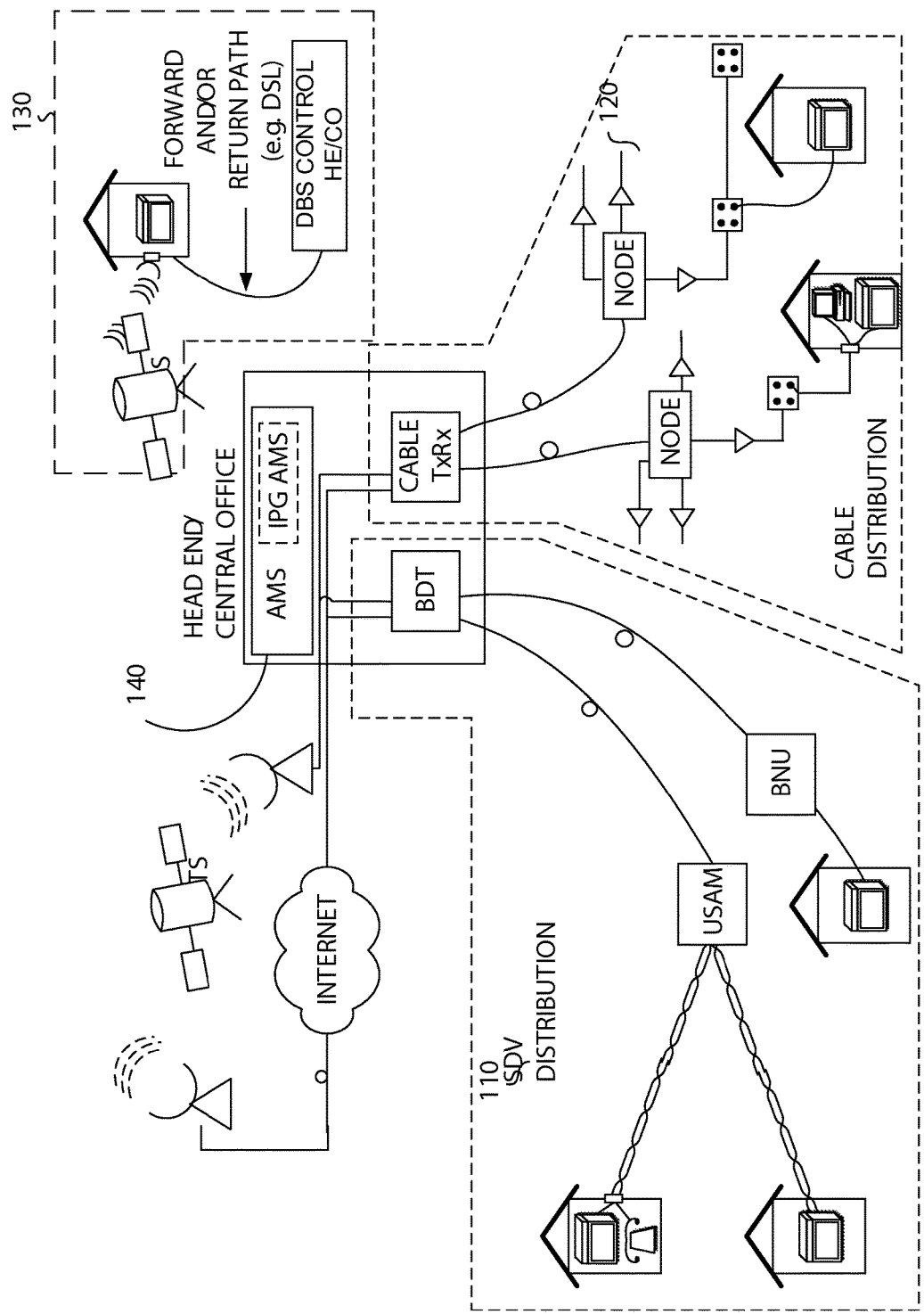
FIG. 1 illustrates a variety of network architectures on which both targeted programming ads and targeted IPG ads can be delivered to subscribers/viewers.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

When used herein the term "IPG" is meant to include and encompass all forms of electronic and interactive program guides as well as all types of content portals, which can be accessed and viewed by a subscriber/viewer (e.g., via a remote control), such content portals being used by the subscriber to navigate to the appropriate or desired content (e.g., TV programming, Internet, program guides, etc.). Furthermore, as will be evident to those of ordinary skill in the art, interactive program guide (IPG) advertisements (ads) can be in any format compatible with the IPG itself. These forms include, but are not limited to, conventional panel ads, static and non-static, HTML and XML based ads including dynamic applets, video and/or audio clips, streaming media, banner ads, etc.

FIG. 1 illustrates network architectures on which both targeted programming ads and targeted IPG ads can be delivered to subscribers-viewers over a variety of network architectures, including Switched Digital Video (SDV) networks (110), hybrid fiber coax (HFC) cable networks (120), and direct broadcast satellite (DBS) systems (130). An Ad Management System (AMS) responsible for, inter alia, subscriber and ad characterization and grouping (e.g., matching ads to subscribers) and ad traffic and billing may reside at the head-end (HE) or central office (CO) as shown (140), or may be a distributed system with elements residing upstream from the HE/CO as well as downstream at a set-top-box (STB). In a preferred embodiment there is a single integrated AMS which manages both the programming ads and the IPG ads. Alternatively, a programming ad AMS and an IPG AMS may exist independently for managing programming ads and IPG ads respectively. Such AMS and IPG AMS systems are described in detail in Applicant's U.S. application Ser. No. 60/183,411 filed on Feb. 18, 2000 and 60/238,056 filed on Oct. 5, 2000 entitled "Method and System for Addressable Advertising in the Electronic Program Guide", both of which are herein incorporated by reference.

In the case that the programming AMS and the IPG AMS are separate, an appropriate interface between the two systems would be established to allow for establishing linkages between the two types of ads and for correlating their respective schedules (vide infra). Targeted ads, both programming ads and IPG ads, can be delivered and presented to the viewer by ad substitution and insertion upstream (i.e., at the HE/CO) or by local ad insertion at the STB as described herein. Moreover, targeted programming ads may be inserted upstream whereas targeted IPG ads are inserted at the STB (or vice versa). In any case, specific programming ads and IPG ads may be linked such that they are displayed in an appropriate, temporally linked, sequence (e.g., the schedule and display of mutually linked programming and IPG ads are interdependent such that an IPG ad immediately precedes and/or follows a programming ad to which it is linked).

Figure 2:
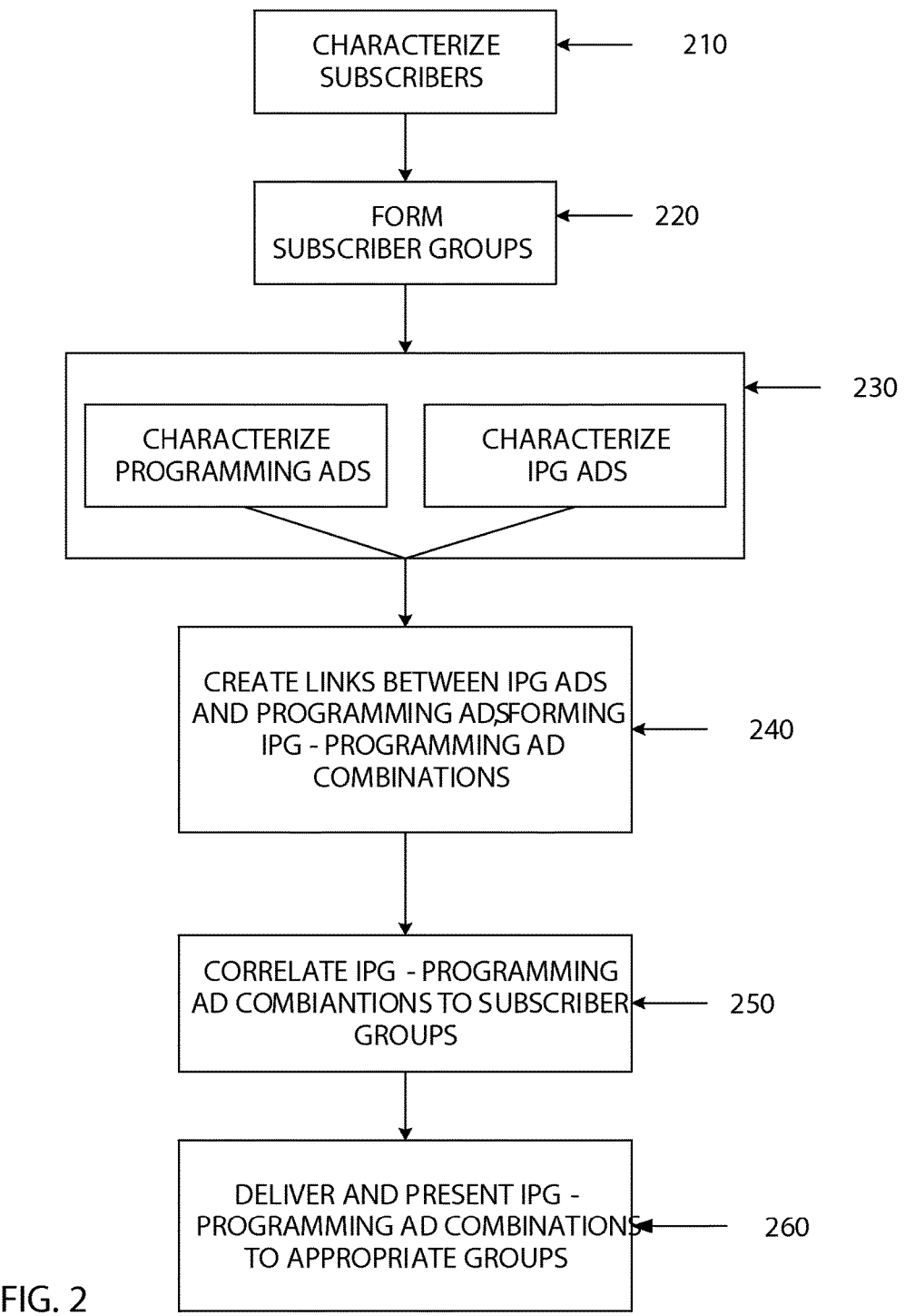
FIG. 2 illustrates an overall process by which an enhanced form of targeted advertising, linking the display of programming ads and correlated IPG ads, may be accomplished according to one embodiment of the present invention.

FIG. 2 illustrates an overall process by which an enhanced form of targeted advertising, linking the display of programming ads and correlated IPG ads, may be accomplished according to one embodiment of the present invention. Subscribers are characterized (210) and subscriber groups are formed (220) based on specific market segmentation criteria (e.g., entered by the advertiser or media buyer). Programming ads and IPG ads are also characterized (230) and linkages are established between specific programming ads and related IPG ads to form programming-IPG ad combinations (240). Such combinations may be one to one, one to many, etc. For instance, for a given programming ad there may be several IPG ads which are related to the programming ad and thus may be each be linked to the programming. Alternatively, there may be a single IPG ad which can be related to multiple programming ads.

Figure 3:
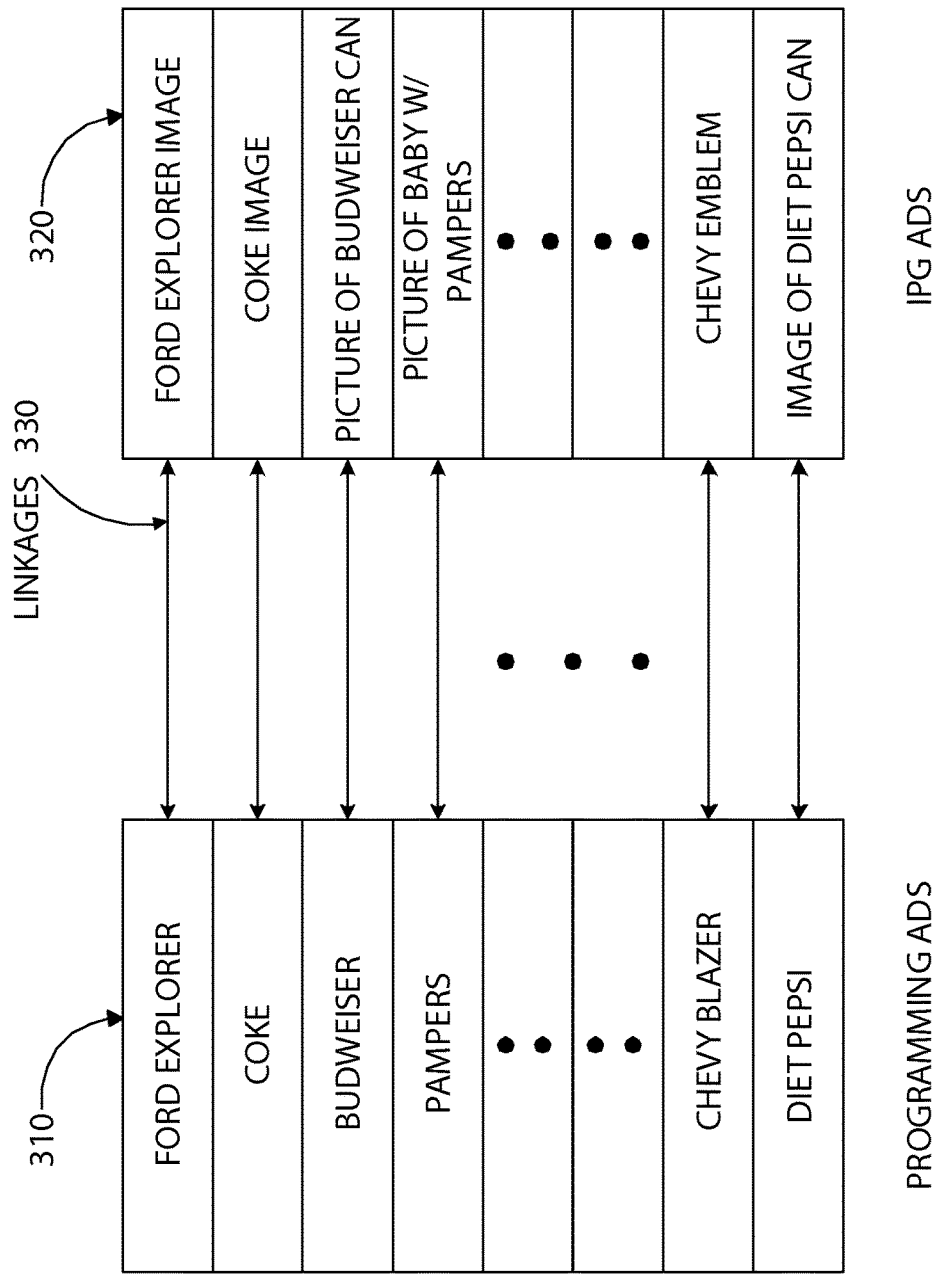
FIG. 3 shows a programming ad queue and a linked IPG ad queue, according to one embodiment of the invention.

FIG. 3 shows a group of programming ads 310 and a group of IPG ads 320 and the linkages 330 between them according to one embodiment of the invention. In this example, the linkages are one-to-one and the respective groups of ads are represented as ad queues, but it is to be understood that the number of linkages between particular programming ads and particular IPG ads, and the criteria for establishing such linkages, may be widely variable and dynamic and may depend on numerous factors including, but not limited to, advertiser preferences, ad formats, and scheduling constraints (see examples discussed below).

Referring back to FIG. 2, the IPG-programming ad combinations are correlated with the subscriber groups (250) (i.e., particular IPG-programming ad combinations are matched to particular subscriber groups). It should be noted that although the IPG-programming ad combinations are formed initially, and then those combinations are correlated to subscriber groups, as described above, the individual programming ads and IPG ads could be correlated to subscriber groups before forming the IPG-programming ad combinations. The combinations would then be formed after both types of ads have been independently correlated to the subscriber groups. IPG-programming ad combinations, which have been matched to particular subscriber groups, are then delivered and presented to these groups (260). The mechanisms for ad delivery and presentation include, but are not limited to, upstream ad substitution resulting in multiple presentation streams and/or ad insertion at the STB. These mechanisms as well as the method of matching ads to subscribers are discussed in detail in Provisional application No. 60/229,156 filed on Aug. 31, 2000 and 60/238,056 filed on Oct. 5, 2000.

The linkage or correlation between programming ads and IPG ads could be very "tight" in the sense that the same product or service is advertised in both the programming and in the IPG, or could be relatively "loose" in that, for example, only ads for the same brand of product or category of product are linked between programming and the IPG. An example of a tight linkage would be a programming ad for a FORD Explorer™ to be followed, by an ad in the IPG, of a FORD Explorer™. An example of a loose linkage is that of a programming ad for a particular Kraft™ cheese product followed by an IPG ad for Kraft in general, or a programming ad for Diet Coke™ followed by a panel ad for Coca Cola™ in the IPG. Moreover, advertisers could "partner" to deliver effective correlated ads. For instance, a programming ad for Budweiser™ could be followed (or preceded) by an ad for Hanover™ pretzels in the IPG, or an ad for "travel to the Bahamas" could be followed by an IPG ad for a particular hotel, airline, travel agent, etc. As will be evident to those skilled in the art, a wide variety of programming and IPG ad combinations and campaigns are possible ranging from extremely tight correlations to extremely loose correlations. The degree of correlations between the programming and IPG ads can be chosen or set depending on a multitude of factors, including pricing and timing, and by a variety of participants including the advertiser, the ad management system (AMS), the subscriber, etc.

Ad Storage and Insertion at the STB-PVR

In a preferred embodiment, all of the ads are stored locally at the STB (or other PVR device). In this scenario it is possible to correlate the schedule and the display of specific IPG ads to the display of specific programming ads in real-time and near-real time. As described in detail in the above mentioned co-pending applications, both programming and IPG ad queues can be created at the STB creating "virtual roadblocks" for both types of ads. What this means is that, in one embodiment, no matter what channel is being watched (i.e., program is being viewed), when an avail arrives in the programming, the next programming ad in the prioritized ad queue is inserted and displayed to the viewer. Similarly, with the IPG ad queue, ads to be displayed next in the IPG can be ordered and prioritized according to a number of parameters. One parameter for ordering each queue is to establish a priority linkage between the two types of ads (programming and IPG) such that if, for example, a particular IPG ad is displayed, one or more particular programming ads will be displayed soon or immediately thereafter in the programming avails. Conversely, if a particular programming ad is displayed, one or more particular IPG ads would be subsequently displayed when the IPG is invoked.

To illustrate one embodiment of the invention reference is made to FIG. 3 which shows a programming ad queue (310), comprising a number of different programming ads stored and prioritized for scheduling at the STB, and an IPG ad queue (320) comprising a number of different IPG ads (or IPG screens with different ads) to be displayed, according to some schedule, in the IPG when the IPG is invoked. As shown in the FIG. 3, there exist correlations or linkages (330), between the programming ads and the IPG ads. In this example there is a one to one correspondence between a specific programming ad and a specific IPG ad. For instance, the programming ad for FORD Explorer is linked to the IPG ad which, in this case, is a static image of a FORD Explorer vehicle. The programming ad for Pepsi™ is linked to an IPG ad consisting of an image of a Pepsi can. Although, this example shows only a one to one correspondence between programming and IPG ads for specific products, it is to be understood, that this is not a limitation of the invention, and that one or more of the programming ads can be linked to multiple IPG ads and vice versa. Moreover the linkages between IPG and programming ad can be relatively "tight" or "loose" depending on the application (e.g., advertiser preference) as described above. In the example just described, the linkages are tight in that both the programming ad and the IPG ad advertise the same product. Looser linkages are also possible, for instance an IPG image of a FORD logo instead of the particular Explorer model, or an image of "beer pretzels" in the IPG preceding a programming ad for Budweiser.

In a preferred embodiment, and as described in the application Ser. No. 60/229,156 filed on Aug. 31, 2000 incorporated herein by reference, programming ads residing on the STB are prioritized or scheduled for display, such prioritization being dynamic in that if, for example, the channel being viewed is changed or another viewer is identified, the order of programming ads to be displayed may be reordered to achieve effective targeting. In any case, at any given moment, there is always a schedule or prioritized queue of programming ads ready to be inserted and displayed. Using this schedule of programming ads, the IPG ad queue is generated such that the corresponding IPG ad or ads, linked to specific programming ads, are scheduled to be displayed in the IPG just prior to or just after the specific programming ad is displayed (i.e., if and when the IPG is invoked). The IPG ad queue may be dynamically reordered to be consistent with the programming ad queue.

Figure 4:
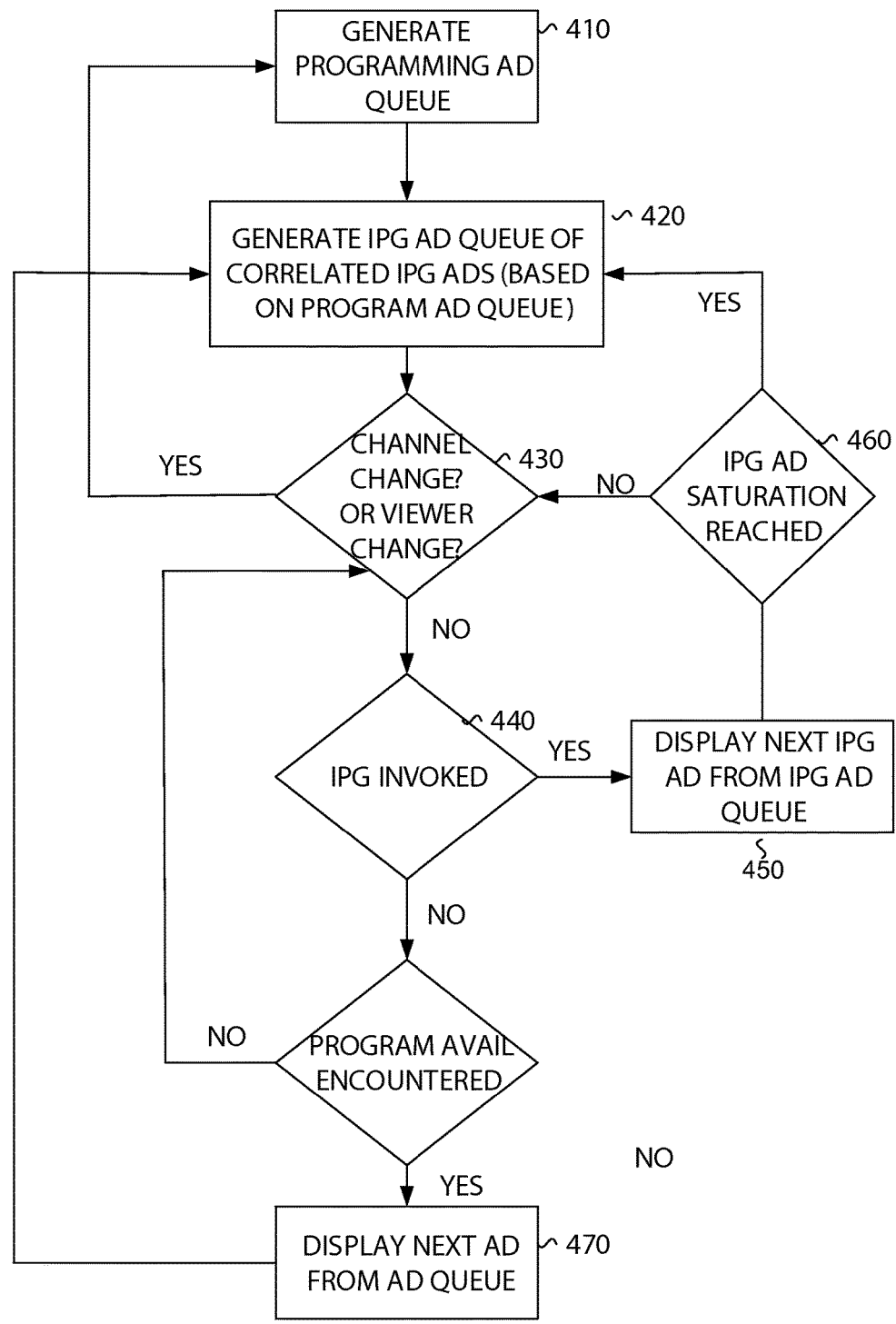
FIG. 4 illustrates a process flow chart of how correlated or linked programming ads and IPG ads are presented to the viewer in a temporally linked sequence, according to one embodiment of the invention.

FIG. 4 illustrates a process flow of how, according to one embodiment of the invention, correlated or linked programming ads and IPG ads are presented to the viewer in a temporally linked sequence. As will be evident to those skilled in the art, the process described below is but one example of how the presentation of programming ads and IPG ads could be linked, there being a multitude of other ways (including variations on the described process) to implement the desired ad linkages. Initially, depending on various parameters including what channel is being viewed and the identity of the viewer, an ad queue or schedule of programming ads is generated (410) (or is retrieved, having previously been generated). Once the programming ad queue is formed, a corresponding IPG ad queue is formed (420), which prioritizes (i.e., schedules in display sequence) IPG ads, based on their correlations (or lack thereof) with the programming ads in the programming ad queue. For instance, if the first three ads in the programming ad queue are for FORD, Coke, and Budweiser respectively, the initial ads in the IPG ad queue would be ads correlated to FORD, Coke, and Budweiser. There may be one or more IPG ads corresponding to a single programming ad, or the same IPG ad may be displayed one or more times before and after the programming ad as desired. For example, if a FORD ad is next in the programming ad queue, there may be two or more IPG FORD ads scheduled, such that an IPG FORD ad is displayed both prior to and subsequent to the programming FORD ad. Moreover, the IPG ad queue can be adjusted (vide infra) to insure that the IPG ads related or linked to the programming ads are displayed during IPG invocations that occur near in time to the displayed programming ad.

If an event occurs (430), such as a channel change or change in viewership (e.g., a new viewer), such that the current programming ad queue comprises ads that are not the most appropriate for the channel or viewer, then the programming ad queue can be regenerated and optimized (410) for the current program or viewer. When the programming ad queue is regenerated, the IPG ad queue is also regenerated (420) to maintain the appropriate temporal display sequence relationship of correlated programming ads and IPG ads.

In this example embodiment, if the IPG is invoked (440) before the next programming avail, the appropriate (i.e., next ad in the queue) IPG ad is displayed (450). After the IPG is dismissed, a check is made as to whether or not a particular IPG ad has been saturated (460) (e.g., repeated too often). If the threshold of saturation has not been reached then the IPG ad queue is updated (i.e., regenerated) which, for example, may entail that the same ad that was displayed in the IPG is again put at the top of the queue so that it can precede the correlated programming ad. Such a circumstance would be encountered if the viewer accessed the IPG many times prior to the occurrence of a programming avail. If on the other hand the same IPG ad has been repeated too often and has reached a saturation threshold, the IPG ad queue may not regenerated, thus insuring that the next ad in the IPG queue is different from the preceding one. Alternatively, the IPG queue may be regenerated even under saturation conditions, but instead of the saturated IPG ad being scheduled next, a related (i.e., also linked to the programming ad) but different ad is put at the top of the queue. Such a scheme would maintain the linkage between the programming and IPG ads while avoiding IPG ad saturation.

Upon dismissal of the IPG, a check is made as to whether an event has occurred that necessitates a more appropriate sequence of programming ads and thus a regeneration of the programming ad queue (430). Such events may include, but are not limited to, channel changes (i.e., different programming) and viewership changes. If such an event has occurred, a new programming ad queue is generated (410) and then a new IPG ad queue is generated (420). If no such event has occurred, then the process continues and waits for the next IPG invocation, for displaying the IPG ad at the top of the queue, and for the next programming avail, for displaying the programming ad at the top of the programming ad queue.

When a programming avail is encountered, the programming ad at the top of the current (i.e., most recently generated) programming ad queue is inserted and displayed in that avail (470). Then, the IPG ad queue is regenerated to take into account that the programming ad queue has changed (i.e., incremented to the next ad in the queue). The regeneration of the IPG ad queue can result in a change to that queue or, alternatively, no change to the queue depending on the parameters of the queue scheduler. Subsequent invocation of the IPG following a programming ad will, in a preferred embodiment, result in the display of an IPG ad that was linked to the most recent programming ad. This is but one example of how related programming ads and IPG ads can be scheduled and rescheduled in ad queues, according to circumstantial and parametric changes, to provide for IPG ads to be presented to the viewer both immediately before and/or immediately after a correlated programming ad.

FIG. 5 depicts a hypothetical example sequence of programming and IPG ads, as seen by one or more viewers, according to one embodiment of the invention. The viewer is watching NBC's Tonight Show (510), and when the commercial break arrives (i.e., the programming avails) a targeted ad for FORD Explorer (520) is shown followed by a targeted ad for Coke™ (525), after which the Tonight Show programming resumes (510). Soon thereafter the viewer invokes the IPG (530), and ads for FORD (532) and Coke (534), that are linked to the previous programming ads, are displayed in the IPG. The viewer then dismisses the IPG (536) and continues watching NBC, but soon after changes the channel (540) to watch ABC's Nightline™ (542). At this point the programming ad queue may or may not be updated depending on various factors such as whether or not the next ad in the queue will fit into the next upcoming avail of the current channel. The viewer invokes the IPG (550) and IPG ads for Budweiser (552) and Chevrolet (554) are displayed in the IPG. These ads are displayed because, in this example, they are linked to the programming ads that are next in the programming ad queue, namely ads for Chevrolet and Budweiser. The IPG is dismissed (558) and the viewer resumes watching Nightline (542). When the next programming avails are encountered (560), the programming ads for Chevrolet (562) and for Budweiser (564) are displayed. Nightline (542) returns after the commercial break, and the viewer subsequently invokes the IPG (570), in which a related Budweiser (572) and another, in this case, unrelated ad (574) are displayed. Soon after the viewer dismisses the IPG and returns to programming, a change event is encountered (580) involving both a channel change (to the H&G channel) and viewership change. This event may signal the STB processor (or upstream processor) to re-compute or use a different set of ad queues for inserting into upcoming programming avails and IPG screens (e.g., consistent with a new viewer profile). At the next commercial break (590), targeted ads for Pampers™ (592) and for Diet Pepsi™ (594) are presented to the viewer, and soon thereafter when the viewer invokes the IPG, ads for Diet Pepsi (596) and for Pampers (598) are displayed in the IPG.

Although the above example illustrates the general concept and a particular method for linking the display of related programming ads and IPG ads, it is important to note that this is only a simple example of the different combinations and sequences of correlated programming and IPG ads that can be displayed to one or more viewers. It should also be noted that although the IPG screens depicted in the FIG. 5 are the familiar grid format with panel ads, other types of IPG ads can also be displayed, as well as other IPG screens that provide additional or complementary means for displaying a wide variety of ads (e.g., the IPG information screen is a different format than that of the IPG guide screen and can accommodate ads of a differing format).

In an alternate embodiment, the IPG can also be used as a virtual roadblock, insuring that, if a viewer invokes or enters the IPG during a specific programming ad, the viewer is presented with an IPG ad that is linked to the particular programming ad. Thus, if a viewer invokes the IPG during a programming commercial break, the same (or similar) commercial or linked IPG ad can be displayed in the IPG. For instance, if a viewer is presented a programming ad for FORD Explorer and immediately invokes the IPG, a related FORD ad (or for that matter a competitor's ad such as a Chevrolet ad) is displayed in the IPG. The IPG ad can be video, audio, a static or dynamic panel ad, or any other ad format compatible with the IPG. Moreover, with Picture-in-Picture (PIP) capability, the actual (or alternate) programming ad being displayed can be shown in the IPG while the viewer had the IPG invoked.

Although the programming ads and the IPG ads can be managed by separate ad management systems (AMS), according to one embodiment, the IPG AMS and programming AMS are integrated and the advertiser or media buyer purchases or contracts for one or more ad campaigns comprising one or more programming ads or one or more IPG ads. In a preferred embodiment, the contract "flight" is a sequence of correlated or linked programming ads and IPG ads. For example, Ford may wish to advertise their Explorer model and may wish to have an IPG ad precede and or follow a programming ad for the model, in which case FORD would contract for such a flight and the integrated programming and IPG ad AMS would generate a schedule and deliver both programming and IPG ads for display in a linked fashion.

In one embodiment, targeting of programming ads is accomplished by forming one or more target groups comprising one or more subscribers/viewers, and directing to those groups different targeted ads via upstream ad substitution and insertion. A system for achieving such targeted ad delivery is described in detail in Applicant's co-pending application Ser. No. 09/568,084 filed on May 10, 2000 entitled "Advertisement Subgroups for Digital Video Streams" which is incorporated herein by reference. In this embodiment, multiple presentation streams are formed, each corresponding to a target group, and different targeted ads are inserted into each stream's avails and delivered to the subscribers. The ad substitution and insertion occurs upstream from the subscriber's residence (e.g., cable head-end or telco central office (CO)), and each subscriber group receives the appropriate (i.e., different) targeted ads for a given avail.

In this embodiment, targeted IPG ads are linked to the targeted programming ads such that the IPG ads are displayed prior to and/or subsequent to the display of a targeted programming ad. As described in the above mentioned applications, the AMS will have knowledge of which subscribers receive which programming ads during specific programming. Also, as described in Applicant's application Ser. No. 60/238,056 filed on Oct. 5, 2000 entitled "Method and System for Addressable Advertising in the Electronic Program Guide", targeted advertising can be delivered via an EPG/IPG AMS. In one embodiment, the IPG AMS is provided the schedule of programming ads to be delivered by the AMS. This information includes, inter alia, subscriber groups and which ads are to be delivered in particular programming avails to those groups (the avail data include programming context and timing). Using this programming ad schedule the IPG AMS, utilizing the same grouping information can deliver targeted IPG ads in conjunction and correlated with the programming ads. An example method of how this is accomplished is now described.

An ad management system (AMS) contains schedule information about which programming ads are carried and displayed in the programming avails. This may include only information about the avails that are available for local ad substitution or, alternatively, may include all commercial spots, including "national" spots carried by the networks. The following example for simplicity and clarity sake, will consider only the four major networks, ABC, CBS, NBC, and FOX, but it is to be understood that this technique could be extended to an arbitrary number of networks. The four national network feeds comprise programming and advertisements (both national and locally inserted ads). An AMS will have knowledge of all avails (i.e., the timing and duration) on each network and will also know which ads are carried and displayed in each of the avails. A national advertiser may contract with the service provider to deliver IPG ads in association with that advertiser's programming ads.

In one embodiment, the advertiser would supply the service provider with the appropriate IPG ads. These IPG ads could be downloaded to the subscriber's STB in advance for storage or could be downloaded to the subscriber's receiver in real-time (i.e., when the IPG is invoked). The AMS would send the STB client IPG instructions regarding which IPG ads/screens to display (or request). These instructions could be in the form of a map linking the channel being watched and the time with one or more specific IPG ads. Because the AMS would know exactly which ads are presented on which channels and in which avail (i.e., at which time), and because the IPG would know which channel was currently tuned to, the IPG, using the map instructions from the AMS, could determine which IPG ad to be displayed.

Alternatively, in the case that the IPG is downloaded in real-time from an upstream server, the server would possess the instructional map with which to determine which IPG ads to download. For example, the IPG is invoked by the viewer at 10:22 pm on a Wednesday. The IPG, using the instructional map, determines that the last channel tuned to was NBC, and that the programming carried is "Law and Order" and that the most recent programming ad was for FORD and the next programming ad will be for Coke. The IPG is then displayed with a FORD and COKE panel ad for example.

In an alternate embodiment, the network or advertiser inserts a code into the program or ad (e.g., via the vertical blanking interval (VBI) or as a separate MPEG-2 data service) which identifies the program, or the ad, or the categories of each, or a specific IPG ad. The subscriber's receiver "decodes" and processes this code, and uses the code to determine which IPG ad (or IPG screen) to display at the next IPG invocation. For instance, during NBC's "Law and Order," a national ad for FORD is carried in the avail. In the VBI of this ad is an identifier that can be used to select (or request) an appropriate IPG ad or IPG screen. The appropriate ad may be stored at the receiver or may be requested from an upstream server for display during a subsequent IPG display. Alternatively, these ads (or programming) and their associated identifier data can be intercepted and processed upstream at the head end. In this case the HE would be able to determine and deliver the appropriate IPG ads or screens to the subscriber.

In another embodiment, the IPG ad itself could be carried in the programming ad (e.g., in the VBI or MPEG data service), in which case it would be extracted by the receiver for subsequent display and/or could be displayed in the IPG immediately if the subscriber invokes the IPG while watching the programming ad.

In accordance with the ATSC PSIP standard, which is herein incorporated by reference, directed channel change (DCC) commands can be sent with programming at appropriate times in order to "force-tune" the TV or STB to the appropriate channel. In an example embodiment, a network, CBS will broadcast 6 digital standard definition TV programs in one 6 MHz analog channel, each with coincident avails containing different ads for different target groups. Alternatively, CBS may transmit one program in the 6 MHz channel, but at the commercial break, transmit 6 or more different targeted, yet synchronous (i.e., avail coinciding) ads in the same channel. The customer premise equipment (CPE), either a TV or STB, will have been "programmed" by the subscriber or other agent such that the CPE is associated with a target group and can be identified as such. For instance, the subscriber may enter their ZIP code at CPE setup, and demographic target groups can be formed based on ZIP code. With this information, the broadcaster can send a DCC command at or prior to the commercial break, which causes the CPE to "force-tune" to the appropriate broadcast stream (e.g., broadcast id) at the appropriate time to receive and display the one targeted ad appropriate for that particular CPE. With the knowledge of which group a particular STB belongs to (i.e., which broadcast stream within the channel the STB/TV will be forced tuned) and knowledge of the different ads to be played on the various streams (e.g., from the AMS), appropriate and correlated IPG ads (i.e., correlated to the programming ads) can be chosen and scheduled for display in the IPG (both prior to and subsequent to the programming ads) such that a correlated ad campaign of ads in the programming and IPG can be generated as described above.

In one case, the IPG is invoked during a programming ad spot. In this circumstance, the ad or ads delivered in the IPG could be either identical or related to the programming ad that was currently playing, or alternatively, the IPG ad could be independent or unrelated since the viewer has shown lack of interest for the programming ad.

Although the various embodiments described herein relate to the co-linking of targeted IPG ads with targeted programming ads, it is to be understood, that the linking of IPG and programming ads could be done in the absence of targeting. That is, correlated IPG and programming ads can be linked in an ad campaign, as described above, even if neither the IPG ad or programming ad or both are targeted. For instance, a non-targeted programming ad for a FORD Explorer™ shown on NBC could be followed by a similar FORD ad presented in the IPG. Neither of these ads is targeted (i.e., linked to a subscriber profile or demographic), the method of advertising in this instance being the conventional "linked sponsorship" presentation model. An important innovative feature of the present invention is that related programming ads and IPG ads are linked and displayed in a sequence, relative to one another, to enhance the effectiveness of what is being advertised, and as will be evident to those skilled in the art, this can be accomplished in the absence of ad targeting. In this example, knowledge of which programming ad was viewed could be extracted (or inferred or statistically predicted) from, inter alia, the channel or program being watched and/or the AMS, and a subsequent IPG ad displayed (e.g., from a local IPG ad queue) which was correlated with the programming ad.

Moreover, and as described above, the correlation between IPG and programming ads could be quite "loose." For instance an IPG ad could be linked to one or categories of programming ads (e.g., cars, appliances, travel, finance, etc.). Knowledge of such categories could be derived from sources, including but not limited to, an AMS or the category of programming (i.e., content) in which the ad is shown.

Although this invention has been illustrated by reference to specific embodiments, it will be apparent to those of ordinary skill in the art that various changes and modifications may be made that clearly fall within the scope of the invention. The invention is intended to be protected broadly within the spirit and scope of the appended claims.

What is claimed is:

1. A computer-implemented method of displaying programming ads and content portal advertisements, the computer-implemented method comprising:
    scheduling a programming ad for display based upon a channel being watched and a viewer's profile;
    placing advertisements having content related to the scheduled programming ad into a content portal ad queue having a display sequence of the advertisements;
    determining a correlation between the scheduled programming ad and the related content of each of the advertisements on a scale representing extremely tight to extremely loose;
    prioritizing the display sequence of the advertisements in the content portal ad queue by ordering each correlation on the scale; and
    displaying in a content portal, a next scheduled related advertisement from the content portal ad queue, when the viewer invokes the content portal prior to, during or after the scheduled programming ad being displayed.

2. The computer-implemented method of claim 1, wherein at least one of the advertisements and at least one programming ad is a targeted advertisement.

3. The computer-implemented method of claim 1, wherein user interaction with the related content portal advertisement allows a user to request additional information regarding the displayed programming ad.

4. The computer-implemented method of claim 3, wherein the request for additional information causes the user's Internet browser to be directed to a web page associated with the displayed programming ad.

5. The computer-implemented method of claim 1, wherein user interaction with the related content portal advertisement causes the programming ad to be rescheduled.

6. The computer-implemented method of claim 1, wherein the scheduling of a programming ad is organized into a programming ad queue.

7. The computer-implemented method of claim 6, wherein the programming ad queue is reordered based on the displaying of the content portal advertisement.

8. The computer-implemented method of claim 1, wherein the correlation is one of tight, loose or non-existent.

9. A content portal advertisement system for displaying content portal advertisements and program ads, the system comprising:
    a storage device suitable for storing a plurality of ads scheduled to be displayed during a program and a content portal advertisement queue containing an ordered list of content portal advertisements to indicate a display sequence of the advertisements, each advertisement having content related to one or more of the plurality of program ads;
    a processor suitable for determining a correlation between each program ad with content of the at least one portal advertisement on a scale representing extremely tight to extremely loose and prioritizing the display sequence of the advertisements in the content portal ad queue by ordering each correlation on the scale;
    a server suitable for displaying the next ordered related advertisement from the content portal ad queue when a user invokes a content portal prior to, during or after the scheduled program ad being displayed.

10. The system of claim 9, wherein the storage device is operable connected to the server.

11. The system of claim 9, wherein the processing module is further suitable for reordering the content portal advertisement queue by placing the delivered content portal advertisement at the bottom of the content portal advertisement queue after the content portal advertisement has been displayed.

12. The system of claim 9, wherein at least one of the content portal advertisements or at least one of the program ads is a targeted advertisement.

13. The system of claim 9, further comprising:
    an input module to receive user interaction data obtained from the correlated at least one content portal advertisement, allowing the user to request additional information regarding the displayed program ad.

14. The system of claim 9, wherein the correlation is one of tight, loose or non-existent.

15. A non-transitory computer program product, comprising a computer usable medium having a computer readable program code embodied therein, said computer readable program code adapted to be executed to implement a method of displaying content portal advertisements and programming ads, the method comprising:
    scheduling a programming ad for display based upon a channel being watched and a viewer's identity;
    placing advertisements having content related to the scheduled programming ad into a content portal ad queue having a display sequence of the advertisements;
    determining a correlation between the scheduled programming ad and the related content of each of the advertisements on a scale representing extremely tight to extremely loose;
    prioritizing the display sequence of the advertisements in the content portal ad queue by ordering each correlation on the scale; and
    displaying in a content portal, a next scheduled related advertisement from the content portal ad queue, when the viewer invokes the content portal prior to, during or after the scheduled programming ad being displayed.

16. The computer program product of claim 15, wherein at least one of the content portal advertisements or programming ads is a targeted advertisement.

17. The computer program product of claim 15, wherein viewer interaction with the related content portal advertisement allows a user to request additional information pertaining to the displayed programming ad.

18. The computer program product of claim 17, wherein the request for additional information directs the viewer to a web page associated with the related programming ad.

19. The computer program product of claim 15, wherein user interaction with the content portal advertisement causes the programming ad to be displayed.

20. The computer program product of claim 15, wherein the correlation can be one of tight, loose or non-existent.

* * * * *